(12) United States Patent
Yamazaki

(10) Patent No.: US 10,656,378 B2
(45) Date of Patent: May 19, 2020

(54) IMAGING LENS

(71) Applicant: KANTATSU CO., LTD., Yaita-shi, Tochigi (JP)

(72) Inventor: Kaoru Yamazaki, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 0 days.

(21) Appl. No.: 16/121,370

(22) Filed: Sep. 4, 2018

(65) Prior Publication Data
US 2019/0235207 A1 Aug. 1, 2019

(30) Foreign Application Priority Data
Sep. 1, 2017 (JP) ................................ 2017-168241

(51) Int. Cl.
*G02B 9/60* (2006.01)
*G02B 7/02* (2006.01)
*H04N 5/225* (2006.01)
*G02B 13/06* (2006.01)

(52) U.S. Cl.
CPC ............. *G02B 9/60* (2013.01); *G02B 7/021* (2013.01); *G02B 13/06* (2013.01); *H04N 5/2254* (2013.01)

(58) Field of Classification Search
CPC .......... G02B 9/60; G02B 7/021; G02B 13/06; G02B 13/0045
See application file for complete search history.

(56) References Cited

U.S. PATENT DOCUMENTS 8,654,458 B2 * 2/2014 Tsai .................. G02B 13/0045
359/753
2015/0077864 A1 3/2015 Noda et al.

FOREIGN PATENT DOCUMENTS

JP 5706584 3/2015

* cited by examiner

*Primary Examiner* — Joseph P Martinez
(74) *Attorney, Agent, or Firm* — Hamre, Schumann, Mueller & Larson, P.C.

(57) ABSTRACT

There is provided an imaging lens with high-resolution which satisfies, in well balance, demand of the wide field of view, the low-profileness and the low F-number and excellently corrects aberrations. An imaging lens comprises in order from an object side to an image side, a first lens having negative refractive power, a second lens, a third lens, a fourth lens, and a fifth lens, wherein said second lens has the negative refractive power, and below conditional expressions are satisfied:

$0.1 < T2/T3 < 1.16$ $9 < r3/r4 < 20$ $-0.1 < r5/r6 < 1.4$ where
T2: distance along an optical axis from an image-side surface of the second lens to an object-side surface of the third lens,
T3: distance along the optical axis from an image-side surface of the third lens to an object-side surface of the fourth lens,
r3: paraxial curvature radius of an object-side surface of the second lens,
r4: paraxial curvature radius of an image-side surface of the second lens,
r5: paraxial curvature radius of an object-side surface of the third lens, and
r6: paraxial curvature radius of an image-side surface of the third lens.

20 Claims, 10 Drawing Sheets

IMAGING LENS

The present application is based on and claims priority of a Japanese patent application No. 2017-168241 filed on Sep. 1, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly to an imaging lens which is built in an imaging device mounted in an increasingly compact and high-performance smartphone and mobile phone, an information terminal such as a PDA (Personal Digital Assistant), a game console, PC and a robot, and moreover, a home appliance, a monitoring camera and an automobile with camera function.

Description of the Related Art

In recent years, it becomes common that camera function is mounted in the home appliance, the information terminal equipment, the automobile and public transportation. Furthermore, the image sensor of the imaging device such as the monitoring camera and an on-vehicle camera becomes increasingly compact and large in pixel year after year, and the imaging lens is also required to be compact and to have high performance accordingly.

Demand of wide field of view such as a field of view of 180 degrees or more is increased for the imaging lens used for the monitoring camera and the on-vehicle camera. Furthermore, the brighter imaging lens is demanded in accordance with pixel enhancement.

As a conventional imaging lens aiming for the wide field of view and the high performance, Patent Document 1 (JP 5706584 B1) discloses an imaging lens comprising, in order from an object side, a first lens having positive refractive power, a second lens having negative refractive power, a third lens having the negative refractive power, a fourth lens having negative refractive power, and a fifth lens having the negative refractive power.

However, in lens configurations disclosed in the above-described Patent Document 1, when the wide field of view and low F-number are to be achieved, it is very difficult to correct aberration at a peripheral area, and excellent optical performance can not be obtained.

The present invention has been made in view of the above-described problems, and an object of the present invention is to provide an imaging lens with high resolution which satisfies, in well balance, demand of the wide field of view, the low-profileness and the low F-number and excellently corrects aberrations.

Regarding terms used in the present invention, a convex surface, a concave surface or a plane surface of lens surfaces implies that a shape of the lens surface near an optical axis (paraxial portion), and refractive power implies the refractive power near the optical axis. The pole point implies an off-axial point on an aspheric surface at which a tangential plane intersects the optical axis perpendicularly. The total track length is defined as a distance along the optical axis from an object-side surface of an optical element located closest to the object to an image plane, when thickness of an IR cut filter or a cover glass which may be arranged between the imaging lens and the image plane is regarded as an air.

An imaging lens according to the present invention forms an image of an object on a solid-state image sensor, and comprises in order from an object side to an image side, a first lens having negative refractive power, a second lens, a third lens, a fourth lens and a fifth lens.

The imaging lens having the above-described configuration achieves the wide field of view of an optical system by having the negative refractive power. The second lens suppresses a light ray incident angle to the third lens to be small and properly corrects astigmatism and field curvature. The third lens maintains the low-profileness and properly corrects distortion and the astigmatism. The fourth lens maintains the low-profileness and properly corrects spherical aberration and chromatic aberration. The fifth lens properly corrects the chromatic aberration, the distortion, the astigmatism and the field curvature.

According to the imaging lens having the above-described configuration, it is preferable that a below conditional expression (1) is satisfied:

$$0.1 < T2/T3 < 1.16 \tag{1}$$

where

T2: distance along an optical axis from an image-side surface of the second lens to an object-side surface of the third lens, and T3: distance along an optical axis from an image-side surface of the third lens to an object-side surface of the fourth lens.

The conditional expression (1) defines a ratio of an interval between the second lens and the third lens to an interval between the third lens and the fourth lens, and is a condition for achieving the low-profileness and the proper aberration correction. By satisfying the conditional expression (1), difference between the interval of the second lens and the third lens and the interval of the third lens and the fourth lens is suppressed from being increased, and the low-profileness is achieved. Furthermore, by satisfying the conditional expression (1), the third lens is arranged at an optimum position, and aberration correction function of the lens becomes more effective.

According to the imaging lens having the above-described configuration, it is preferable that a below conditional expression (2) is satisfied:

$$9 < r3/r4 < 20 \tag{2}$$

where r3: paraxial curvature radius of an object-side surface of the second lens, and r4: paraxial curvature radius of an image-side surface of the second lens.

The conditional expression (2) defines relationship between paraxial curvature radii of the object-side surface and the image-side surface of the second lens, and is a condition for properly correcting the aberrations and for reducing sensitivity to manufacturing error. When a value is below the upper limit of the conditional expression (2), the refractive power of the image-side surface of the second lens is maintained, astigmatism and distortion occurred at this surface are suppressed, and it is facilitated to reduce the sensitivity to the manufacturing error. On the other hand, when the value is above the lower limit of the conditional expression (2), the field curvature is properly corrected.

According to the imaging lens having the above-described configuration, it is preferable that a below conditional expression (3) is satisfied:

$$-0.1 < r5/r6 < 1.4 \tag{3}$$

where
r5: paraxial curvature radius of an object-side surface of the third lens, and
r6: paraxial curvature radius of an image-side surface of the third lens.

When a value is below the upper limit of the conditional expression (3), the refractive power of the third lens becomes appropriate, and the low-profileness is achieved. On the other hand, when the value is above the lower limit of the conditional expression (3), the distortion is properly corrected.

According to the imaging lens having the above-described configuration, it is preferable that a below conditional expression (4) is satisfied:

$$-1.85<(r9+r10)/(r9-r10)<5.00 \quad (4)$$

where
r9: paraxial curvature radius of an object-side surface of the fifth lens, and
r10: paraxial curvature radius of an image-side surface of the fifth lens.

The conditional expression (4) defines a shape of the fifth lens, and a condition for securing back focus, achieving the low-profileness and properly correcting the aberrations. By satisfying the conditional expression (4), the low-profileness is facilitated while securing the back focus, and the distortion, the chromatic aberration, the astigmatism and the field curvature are properly corrected.

According to the imaging lens having the above-described configuration, it is preferable that the refractive power of the second lens is negative, and more preferable that a below conditional expression (5) is satisfied:

$$-5.1<f2/f<-2.65 \quad (5)$$

where
f2: focal length of the second lens, and
f: focal length of the overall optical system of the imaging lens.

By having the negative refractive power, the second lens achieves the wide field of view, and properly corrects the astigmatism and coma aberration. The conditional expression (5) defines the refractive power of the second lens, and is a condition for achieving the low-profileness and proper correction of the aberrations. When a value is below the upper limit of the conditional expression (5), the negative refractive power of the second lens becomes appropriate, and the low-profileness is achieved. On the other hand, when the value is above the lower limit of the conditional expression (5), the field curvature is properly corrected.

According to the imaging lens having the above-described configuration, it is preferable that the fourth lens has a biconvex shape having convex surfaces facing both surfaces near an optical axis.

By having the biconvex shape, the object-side surface and the image-side surface of the fourth lens have positive refractive power, and the low-profileness is facilitated. Furthermore, the biconvex shape has an effect to suppress curvature from being large, and to reduce the sensitivity to the manufacturing error.

According to the imaging lens having the above-described configuration, it is preferable that an image-side surface of the fifth lens is the concave surface facing the image side near the optical axis. Furthermore, it is more preferable that an aspheric surface having an off-axial pole point is provided.

When the image-side surface of the fifth lens is the concave surface facing the image side near the optical axis, the field curvature and the distortion are properly corrected. Furthermore, by having the off-axial pole point on the image-side surface of the fifth lens, the field curvature and the distortion are properly corrected.

According to the imaging lens having the above-described configuration, it is preferable that composite refractive power of the first lens, the second lens and the third lens is negative, and more preferable that a below conditional expression (6) is satisfied:

$$-3.5<f123/f<-1.0 \quad (6)$$

where
f123: composite focal length of the first lens, the second lens and the third lens, and
f: focal length of the overall optical system of the imaging lens.

When the composite refractive power of the first lens, the second lens and the third lens is negative, the wide field of view is more facilitated. The conditional expression (6) defines a range of the composite focal length of the first lens, the second lens and the third lens to the focal length of the overall optical system of the imaging lens, and a condition for achieving the wide field of view and the low-profileness, and the proper aberration corrections. When a value is below the upper limit of the conditional expression (6), the negative composite refractive power of the first lens, the second lens and the third lens becomes appropriate, and correction of the spherical aberration and the distortion becomes facilitated. Furthermore, the low-profileness can be also achieved. On the other hand, when the value is above the lower limit of the conditional expression (6), the wide field of view can be achieved.

According to the imaging lens having the above-described configuration, it is preferable that a below conditional expression (7) is satisfied:

$$-9.5<f1/f<-2.5 \quad (7)$$

where
f1: focal length of the first lens, and
f: focal length of the overall optical system of the imaging lens.

The conditional expression (7) defines the refractive power of the first lens, and is a condition for achieving the wide field of view and the low-profileness, and the proper aberration corrections. When a value is below the upper limit of the conditional expression (7), the negative refractive power of the first lens becomes appropriate and the correction of the spherical aberration is facilitated. On the other hand, when the value is above the lower limit of the conditional expression (7), the wide field of view can be achieved.

According to the imaging lens having the above-described configuration, it is preferable that the refractive power of the third lens is positive, and more preferable that a below conditional expression (8) is satisfied:

$$5.7<f3/f \quad (8)$$

where
f3: focal length of the third lens, and
f: focal length of the overall optical system of the imaging lens.

When the third lens has the positive refractive power, the low-profileness is more facilitated. The conditional expression (8) defines the refractive power of the third lens, and is a condition for achieving the low-profileness and the proper aberration corrections. When a value is above the lower limit of the conditional expression (8), a total track length is shortened and the coma aberration and the astigmatism are properly corrected.

According to the imaging lens having the above-described configuration, it is preferable that a below conditional expression (9) is satisfied:

$$14.5<|f5|/f \quad (9)$$

where
f5: focal length of the fifth lens, and
f: focal length of the overall optical system of the imaging lens.

The conditional expression (9) defines the refractive power of the fifth lens, and is a condition for achieving the low-profileness and proper correction of the aberrations. When a value is above the lower limit of the conditional expression (9), the total track length is shortened and the chromatic aberration and the field curvature are properly corrected.

According to the imaging lens having the above-described configuration, it is preferable that a below conditional expression (10) is satisfied:

$$1.85<r1/r2<5.75 \quad (10)$$

where
r1: paraxial curvature radius of an object-side surface of the first lens, and
r2: paraxial curvature radius of an image-side surface of the first lens.

The conditional expression (10) defines relationship between paraxial curvature radii of the object-side surface and the image-side surface of the first lens, and is a condition for achieving the proper aberration corrections. When a value is below the upper limit of the conditional expression (10), the astigmatism is properly corrected. When the value is above the lower limit of the conditional expression (10), the field curvature is properly corrected.

According to the imaging lens having the above-described configuration, it is preferable that a below conditional expression (11) is satisfied:

$$-1.85<r7/r8<-0.55 \quad (11)$$

where
r7: paraxial curvature radius of an object-side surface of the fourth lens, and
r8: paraxial curvature radius of an image-side surface of the fourth lens.

The conditional expression (11) defines relationship between paraxial curvature radii of the object-side surface and the image-side surface of the fourth lens, and is a condition for properly correcting the aberrations and for reducing the sensitivity to manufacturing error. By satisfying the conditional expression (11), the refractive power of the object-side surface and the image-side surface is suppressed from being excessive, and the proper correction of the aberrations is achieved. Furthermore, the sensitivity to the manufacturing error of the fourth lens is reduced.

According to the imaging lens of the above-described configuration, it is preferable that a below conditional expression (12) is satisfied:

$$28<vd4-vd5<78 \quad (12)$$

where
vd4: abbe number at d-ray of the fourth lens, and
vd5: abbe number at d-ray of the fifth lens.

The conditional expression (12) defines relationship between the abbe numbers at d-ray of the fourth lens and the fifth lens, and is a condition for properly correcting the chromatic aberration. By satisfying the conditional expression (12), the chromatic aberration is properly corrected.

According to the imaging lens having the above-described configuration, it is preferable that a below conditional expression (13) is satisfied:

$$Fno \leq 2.4 \quad (13)$$

where
Fno: F-number.

The conditional expression (13) defines the F-number. When a value is below the upper limit of the conditional expression (13), brightness demanded for the imaging lens in recent years can be fully secured, when it is mounted in a portable mobile device, a digital camera, a monitoring camera, or an onboard camera.

According to the imaging lens having the above-described configuration, it is preferable that the object-side surface of the second lens is the convex surface facing the object side near the optical axis.

When the object-side surface of the second lens is the convex surface facing the object side near the optical axis, the coma aberration and the field curvature are properly corrected.

According to the imaging lens having the above-described configuration, it is preferable that a below conditional expression (14) is satisfied:

$$-186<(1-N3)/(r6 \times f) \times 1000<8 \quad (14)$$

where
N3: refractive index at d-ray of the third lens,
r6: paraxial curvature radius of an image-side surface of the third lens, and
f: focal length of an overall optical system of the imaging lens.

The conditional expression (14) defines an appropriate range of the refractive power of the image-side surface of the third lens, and is a condition for reducing the sensitivity to the manufacturing error and properly correcting the aberrations. By satisfying the conditional expression (14), the refractive power of the image-side surface of the third lens becomes appropriate, and the spherical aberration occurred at the third lens can be effectively suppressed and the sensitivity to the manufacturing error is reduced.

According to the imaging lens having the above-described configuration, it is preferable that a below conditional expression (15) is satisfied:

$$-5<(N5-1)/(r9 \times f) \times 1000<100 \quad (15)$$

where
N5: refractive index at d-ray of the fifth lens,
r9: paraxial curvature radius of an object-side surface of the fifth lens, and
f: focal length of an overall optical system of the imaging lens.

The conditional expression (15) defines an appropriate range of the refractive power of the object-side surface of the fifth lens, and is a condition for reducing the sensitivity to the manufacturing error and properly correcting the aberrations. By satisfying the conditional expression (15), the refractive power of the object-side surface of the fifth lens becomes appropriate, and the spherical aberration occurred at the fifth lens can be effectively suppressed and the sensitivity to the manufacturing error is reduced.

According to the imaging lens having the above-described configuration, it is preferable that the refractive power of the fourth lens is positive, and more preferable that a below conditional expression (16) is satisfied:

$$1.0<f4/f<3.5 \qquad (16)$$

where f4: focal length of the fourth lens, and f: focal length of the overall optical system of the imaging lens.

When the fourth lens has the positive refractive power, the low-profileness is more facilitated. Furthermore, the conditional expression (16) defines the refractive power of the fourth lens, and is a condition for achieving the low-profileness and the proper aberration correction. When a value is below the upper limit of the conditional expression (16), the positive refractive power of the fourth lens becomes appropriate, and the low-profileness can be achieved. On the other hand, when the value is above the lower limit of the conditional expression (16), the spherical aberration and the coma aberration are properly corrected.

According to the imaging lens having the above-described configuration, it is preferable that a below conditional expression (17) is satisfied:

$$1.55<bf/f<3.20 \qquad (17)$$

where bf: distance along an optical axis from an image-side surface of the fifth lens to an image plane (namely, back focus), and f: focal length of an overall optical system of the imaging lens.

The conditional expression (17) is a condition for securing the back focus and achieving the low-profileness. When a value is below the upper limit of the conditional expression (17), the low-profileness can be achieved. On the other hand, when the value is above the lower limit of the conditional expression (17), securing the back focus is facilitated.

Effect of Invention

According to the present invention, there can be provided an imaging lens with high resolution which satisfies, in well balance, demand of the wide field of view, the low-profileness and the low F-number, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5, 7 and 9 are schematic views of the imaging lenses in Examples 1 to 5 according to the embodiments of the present invention, respectively.

Figure 1:
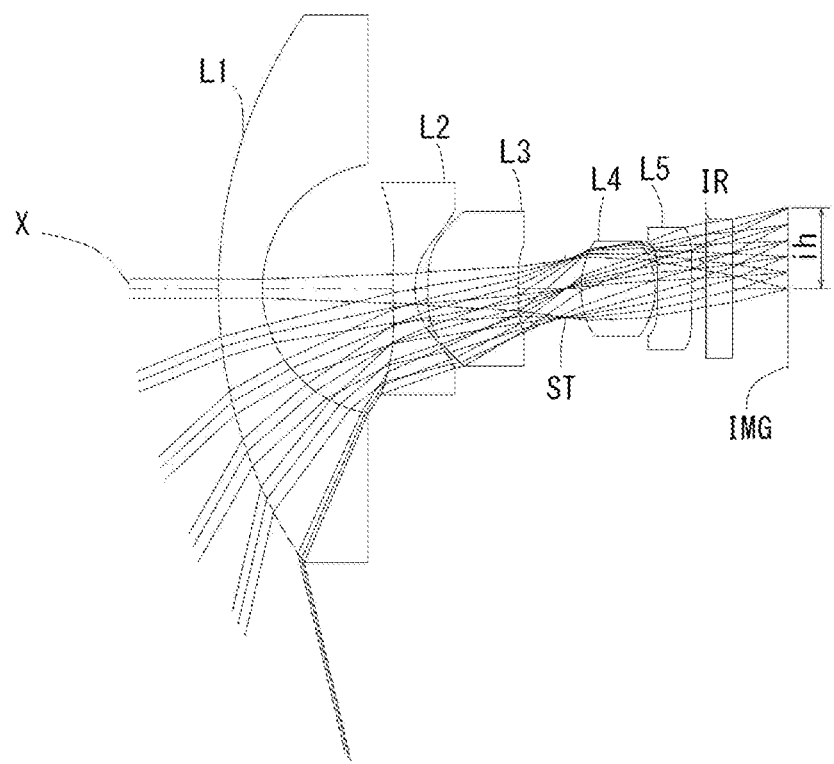
FIG. 1 is a schematic view showing a general configuration of an imaging lens in Example 1 according to the present invention.

As shown in FIG. 1, the imaging lens according to the present embodiments comprises in order from an object side to an image side, a first lens L1 having negative refractive power, a second lens L2, a third lens L3, a fourth lens L4 and a fifth lens L5.

A filter IR such as an IR cut filter and a cover glass is arranged between the fifth lens L5 and an image plane IMG (namely, the image plane of an image sensor). The filter IR is omissible.

The first lens L1 has the negative refractive power, and achieves wide field of view. A shape of the first lens L1 is a meniscus shape having a convex surface facing an object side near an optical axis X, and distortion is properly corrected.

The second lens L2 has negative refractive power, and achieves the wide field of view and properly corrects astigmatism and field curvature. A shape of the second lens L2 is the meniscus shape having the convex surface facing the object side near the optical axis X, and spherical aberration, coma aberration and field curvature are properly corrected.

The third lens L3 has positive refractive power, and maintains low-profileness and properly corrects the distortion and the astigmatism. A shape of the third lens L3 is a meniscus shape having the convex surface facing the object side near the optical axis X, and the spherical aberration, the coma aberration and the distortion are properly corrected. The shape of the third lens L3 may be biconvex shape having convex surfaces facing the object side and the image side near the optical axis X as in Example 4 shown in FIG. 7. In this case, by the positive refractive power of the object-side and the image-side surfaces, the low-profileness is achieved. Furthermore, the biconvex shape suppresses curvature from being large, and reduces sensitivity to manufacturing error. As in Example 5 shown in FIG. 9, a shape having the convex surface facing the object side near the optical axis X and the plane surface facing the image side near the optical axis X may be adopted. In this case, the image-side surface does not affect the refractive power of the lens, and properly corrects the aberration at a peripheral area by providing an aspheric surface.

An aperture stop ST is arranged between the third lens L3 and the fourth lens L4. By arranging the aperture stop ST is arranged between the third lens L3 and the fourth lens L4, it can be achieved to reduce the size in radial direction.

The fourth lens L4 has the positive refractive power, and maintains the low-profileness and properly corrects the spherical aberration and the chromatic aberration. A shape of the fourth lens L4 is the biconvex shape having the convex surfaces facing the object side and the image side near the optical axis X, and the low-profileness is achieved by the positive refractive power of the object-side and the image-side surfaces. Furthermore, the biconvex shape suppresses the curvature from being large, and reduces the sensitivity to the manufacturing error.

The fifth lens L5 has the negative refractive power, and the chromatic aberration, the distortion, the astigmatism and the field curvature are properly corrected. A shape of the fifth lens L5 is a biconcave surface having concave surfaces facing the object side and the image side near the optical axis X, and the chromatic aberration is properly corrected. The refractive power of the fifth lens L5 may be positive as in Example 3 shown in FIG. 5. In this case, the low-profileness is more facilitated. Furthermore, the shape of the fifth lens L5 may be the meniscus shape having the convex surface facing the object side near the optical axis X as in Examples 3, 4 and 5 shown in FIGS. 5, 7 and 9. In this case, the field curvature and the distortion are properly corrected.

According to the present embodiments, the first lens L1 and the fourth lens L4 are glass lenses which spherical surfaces are adopted both on the object-side and the image-side surfaces. Glass material has a small change in optical characteristics associated with temperature. Therefore, when an imaging lens according to the present embodiments is used in a wide temperature range from low to high temperature, high quality can be maintained. Regarding the material of lens, selection either the glass material or a resin material, and regarding the surface type of the lens, selection either the spherical or the aspherical may be properly made in accordance with use environment or demanded performance.

Regarding the imaging lens according to the present embodiments, all lenses are single lenses. Configuration without cemented lenses can frequently use the aspheric surfaces, and proper correction of the aberrations can be facilitated. Furthermore, workload for cementing is not required, and manufacturing in low cost becomes possible.

The imaging lens according to the present embodiments shows preferable effect by satisfying the below conditional expressions (1) to (17):

$$0.1 < T2/T3 < 1.16 \tag{1}$$

$$9 < r3/r4 < 20 \tag{2}$$

$$-0.1 < r5/r6 < 1.4 \tag{3}$$

$$-1.85 < (r9+r10)/(r9-r10) < 5.00 \tag{4}$$

$$-5.1 < f2/f < -2.65 \tag{5}$$

$$-3.5 < f123/f < -1.0 \tag{6}$$

$$-9.5 < f1/f < -2.5 \tag{7}$$

$$5.7 < f3/f \tag{8}$$

$$14.5 < |f5|/f \tag{9}$$

$$1.85 < r1/r2 < 5.75 \tag{10}$$

$$-1.85 < r7/r8 < -0.55 \tag{11}$$

$$28 < vd4 - vd5 < 78 \tag{12}$$

$$Fno \leq 2.4 \tag{13}$$

$$-186 < (1-N3)/(r6 \times f) \times 1000 < 8 \tag{14}$$

$$-5 < (N5-1)/(r9 \times f) \times 1000 < 100 \tag{15}$$

$$1.0 < f4/f < 3.5 \tag{16}$$

$$1.55 < bf/f < 3.20 \tag{17}$$

where
vd4: abbe number at d-ray of the fourth lens L4,
vd5: abbe number at d-ray of the fifth lens L5,
T2: distance along an optical axis X from an image-side surface of the second lens L2 to an object-side surface of the third lens L3,
T3: distance along the optical axis X from an image-side surface of the third lens L3 to an object-side surface of the fourth lens L4,
N3: refractive index at d-ray of the third lens L3,
N5: refractive index at d-ray of the fifth lens L5,
f: focal length of the overall optical system of the imaging lens,
f1: focal length of the first lens L1,
f2: focal length of the second lens L2,
f3: focal length of the third lens L3,
f4: focal length of the fourth lens L4,
f5: focal length of the fifth lens L5,
f123: composite focal length of the first lens L1, the second lens L2 and the third lens L3,
r1: paraxial curvature radius of an object-side surface of the first lens L1,
r2: paraxial curvature radius of an image-side surface of the first lens L1,
r3: paraxial curvature radius of an object-side surface of the second lens L2,
r4: paraxial curvature radius of an image-side surface of the second lens L2,
r5: paraxial curvature radius of an object-side surface of the third lens L3,
r6: paraxial curvature radius of an image-side surface of the third lens L3,
r7: paraxial curvature radius of an object-side surface of the fourth lens L4,
r8: paraxial curvature radius of an image-side surface of the fourth lens L4,
r9: paraxial curvature radius of an object-side surface of the fifth lens L5,
r10: paraxial curvature radius of an image-side surface of the fifth lens L5,
Fno: F-number, and
bf: distance along an optical axis X from an image-side surface of the fifth lens L5 to an image plane (namely, back focus).

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (17a):

$$0.15 < T2/T3 < 1.00 \tag{1a}$$

$$12.5 < r3/r4 < 18.0 \tag{2a}$$

$$-0.08 < r5/r6 < 1.15 \tag{3a}$$

$$-1.70 < (r9+r10)/(r9-r10) < 4.65 \tag{4a}$$

$$-4.5 < f2/f < -3.2 \tag{5a}$$

$$-2.95 < f123/f < -1.35 \tag{6a}$$

$-7.9 < f1/f < -4.3$ (7a)

$8.5 < f3/f$ (8a)

$21.0 < |f5|/f$ (9a)

$2.75 < r1/r2 < 4.80$ (10a)

$-1.55 < r7/r8 < -0.85$ (11a)

$39 < vd4 - vd5 < 67$ (12a)

$Fno \leq 2.2$ (13a)

$-155 < (1-N3)/(r6 \times f) \times 1000 < 6.6$ (14a)

$-4 < (N5-1)/(r9 \times f) \times 1000 < 83$ (15a)

$1.6 < f4/f < 2.9$ (16a)

$1.8 < bf/f < 2.7$ (17a)

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a curvature radius, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, examples of the imaging lens according to this embodiment will be explained. In each example, f denotes the focal length of the overall optical system of the imaging lens, Fno denotes an F-number, ω denotes a half field of view, ih denotes a maximum image height, and TTL denotes a total track length. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

EXAMPLE 1

The basic lens data is shown below in Table 1.

TABLE 1

Example 1
Unit mm
f = 0.93
Fno = 2.0
ω(°) = 103.3
ih = 1.85
TTL = 12.76

| Surface Data | | | | |
|---|---|---|---|---|
| Surface Number i | Curvature Radius r | Surface Distance d | Refractive Index Nd | Abbe Number vd |
| (Object) | Infinity | Infinity | | |
| 1 | 11.0636 | 1.0000 | 1.744 | 44.72 (vd1) |
| 2 | 2.8886 | 2.9813 | | |
| 3* | 28.0000 | 0.5000 | 1.544 | 55.86 (vd2) |
| 4* | 1.8000 | 0.2870 | | |
| 5* | 7.4239 | 2.0713 | 1.661 | 20.37 (vd3) |
| 6* | 30.5101 | 1.0668 | | |
| 7 (Stop) | Infinity | 0.3597 | | |
| 8 | 2.0779 | 1.6910 | 1.553 | 71.68 (vd4) |
| 9 | −1.7978 | 0.0500 | | |
| 10* | −1657.8100 | 0.7730 | 1.661 | 20.37 (vd5) |
| 11* | 27.3866 | 0.3302 | | |
| 12 | Infinity | 0.6100 | 1.517 | 64.17 |
| 13 | Infinity | 1.2488 | | |
| Image Plane | Infinity | | | |

| Constituent Lens Data | | | | | |
|---|---|---|---|---|---|
| Lens | Start Surface | Focal Length | Composite Focal Length | Back Focus | |
| 1 | 1 | −5.544 | f123   −1.939 | b f | 1.981 |
| 2 | 3 | −3.558 | | | |
| 3 | 5 | 14.337 | | | |
| 4 | 8 | 2.063 | | | |
| 5 | 10 | −40.767 | | | |

| Aspheric Surface Data | | | | | |
|---|---|---|---|---|---|
| | Third Surface | Fourth Surface | Fifth Surface | Sixth Surface | Tenth Surface | Eleventh Surface |
| k | 0.000000E+00 | −1.040000E+01 | 0.000000E+00 | 0.000000E+00 | 0.000000E+00 | 0.000000E+00 |
| A4 | −1.548087E−03 | 2.336991E−01 | 1.119540E−01 | 1.003553E−01 | −4.806784E−02 | 2.241104E−03 |

TABLE 1-continued

Example 1
Unit mm
f = 0.93
Fno = 2.0
ω(°) = 103.3
ih = 1.85
TTL = 12.76

| | | | | | | |
|---|---|---|---|---|---|---|
| A6 | −1.771412E−02 | −9.614101E−02 | 5.558553E−03 | −1.645894E−02 | −1.172421E−01 | −3.769237E−02 |
| A8 | 8.041703E−03 | 1.168752E−02 | −1.555787E−02 | 2.440992E−02 | 1.129415E−01 | 1.371282E−02 |
| A10 | −1.646977E−03 | 0.000000E+00 | 2.861995E−03 | 0.000000E+00 | −8.265675E−02 | −7.167589E−03 |
| A12 | 1.647444E−04 | 0.000000E+00 | −2.000000E−16 | 0.000000E+00 | 0.000000E+00 | 1.537473E−03 |
| A14 | −6.491633E−06 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

The imaging lens in Example 1 satisfies conditional expressions (1) to (17) as shown in Table 6.

Figure 2:
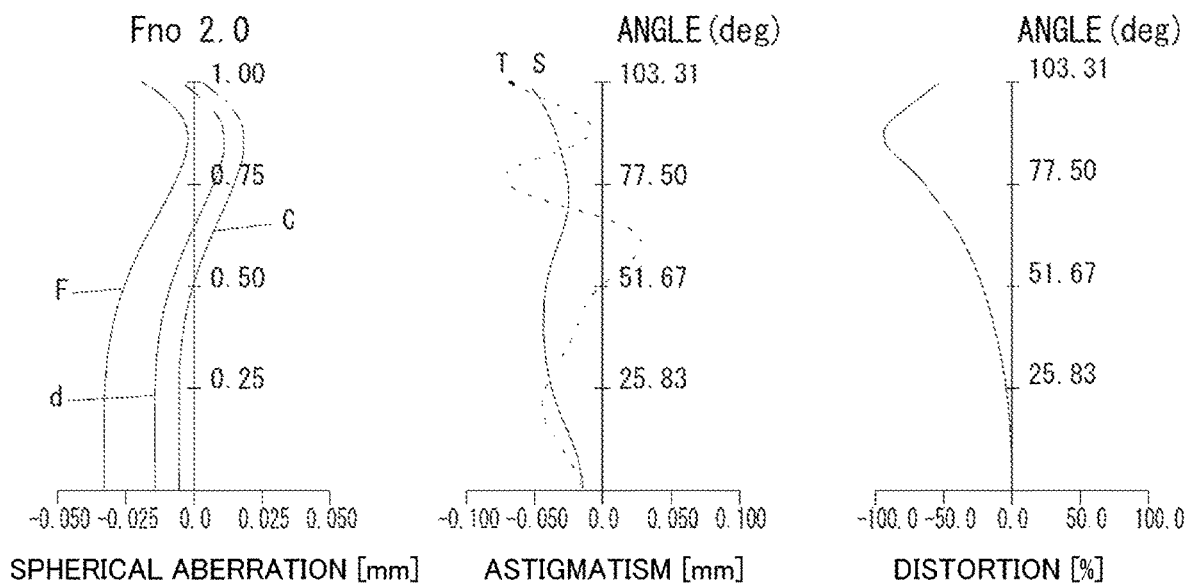
FIG. 2 shows spherical aberration, astigmatism, and distortion of the imaging lens in Example 1 according to the present invention.
Figure 3:
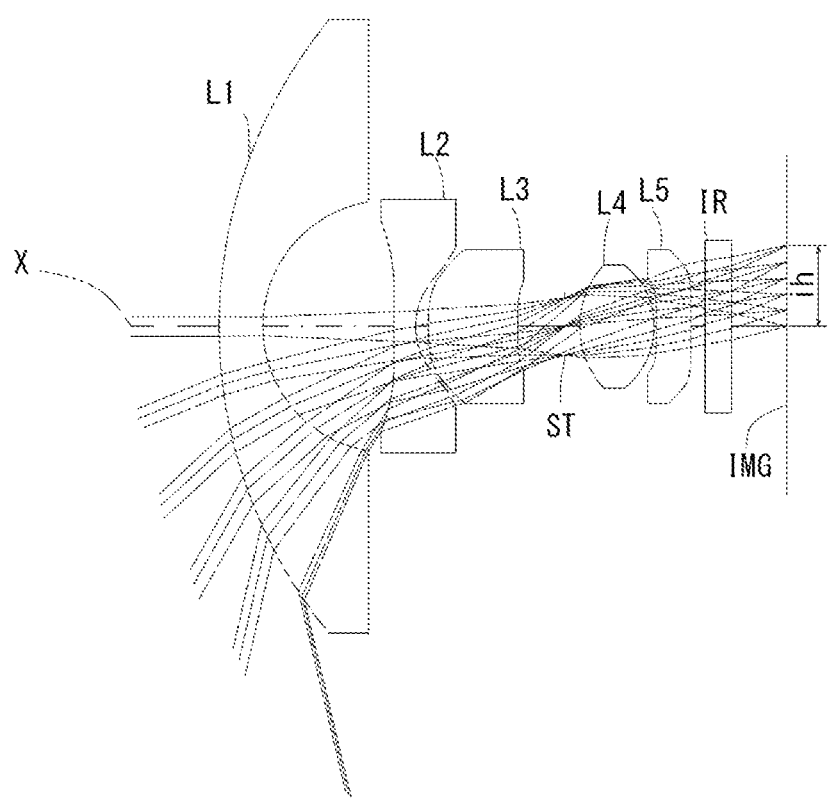
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8 and 10).

EXAMPLE 2

The basic lens data is shown below in Table 2.

TABLE 2

Example2
Unit mm
f = 0.93
Fno = 2.0
ω(°) = 103.3
ih = 1.85
TTL = 12.76

Surface Data

| Surface Number i | Curvature Radius r | Surface Distance d | Refractive Index Nd | Abbe Number vd |
|---|---|---|---|---|
| (Object) | Infinity | Infinity | | |
| 1 | 11.0636 | 1.0000 | 1.744 | 44.72 (vd1) |
| 2 | 2.8886 | 2.9940 | | |
| 3* | 28.0000 | 0.5000 | 1.535 | 56.16 (vd2) |
| 4* | 1.8000 | 0.2879 | | |
| 5* | 7.6453 | 2.0459 | 1.661 | 20.37 (vd3) |
| 6* | 33.4017 | 1.0738 | | |
| 7 (Stop) | Infinity | 0.3474 | | |
| 8 | 2.0938 | 1.6995 | 1.553 | 71.68 (vd4) |
| 9 | −1.7925 | 0.0500 | | |
| 10* | −232.6656 | 0.7814 | 1.661 | 20.37 (vd5) |
| 11* | 31.0419 | 0.3308 | | |
| 12 | Infinity | 0.6100 | 1.517 | 64.17 |
| 13 | Infinity | 1.2473 | | |
| Image Plane | Infinity | | | |

Constituent Lens Data

| Lens | Start Surface | Focal Length | Composite Focal Length | Back Focus |
|---|---|---|---|---|
| 1 | 1 | −5.544 | f123   −1.966 | b f   1.980 |
| 2 | 3 | −3.622 | | |
| 3 | 5 | 14.546 | | |
| 4 | 8 | 2.067 | | |
| 5 | 10 | −41.401 | | |

Aspheric Surface Data

| | Third Surface | Fourth Surface | Fifth Surface | Sixth Surface | Tenth Surface | Eleventh Surface |
|---|---|---|---|---|---|---|
| k | 0.000000E+00 | −1.080000E+01 | 0.000000E+00 | 0.000000E+00 | 0.000000E+00 | 0.000000E+00 |
| A4 | −3.904487E−03 | 2.398638E−01 | 1.152417E−01 | 1.023612E−01 | −4.978045E−02 | −2.296058E−03 |
| A6 | −1.681899E−02 | −9.918802E−02 | 3.814480E−03 | −2.278481E−02 | −1.158165E−01 | −3.377176E−02 |
| A8 | 7.896167E−03 | 1.209868E−02 | −1.533138E−02 | 2.887793E−02 | 1.138644E−01 | 1.310583E−02 |
| A10 | −1.638335E−03 | 0.000000E+00 | 2.884126E−03 | 0.000000E+00 | −8.197834E−02 | −7.257480E−03 |
| A12 | 1.647444E−04 | 0.000000E+00 | −2.000000E−16 | 0.000000E+00 | 0.000000E+00 | 1.537473E−03 |

TABLE 2-continued

Example2
Unit mm
f = 0.93
Fno = 2.0
ω(°) = 103.3
ih = 1.85
TTL = 12.76

| | | | | | | |
|---|---|---|---|---|---|---|
| A14 | −6.491633E−06 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

The imaging lens in Example 2 satisfies conditional expressions (1) to (17) as shown in Table 6.

Figure 4:
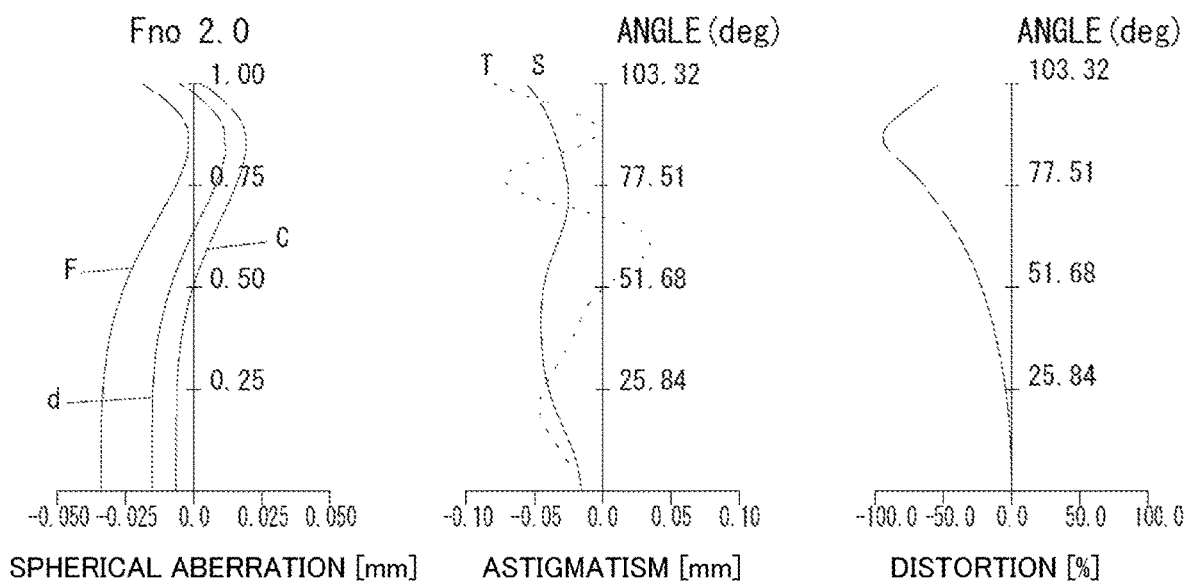
FIG. 4 shows spherical aberration, astigmatism, and distortion of the imaging lens in Example 2 according to the present invention.
Figure 5:
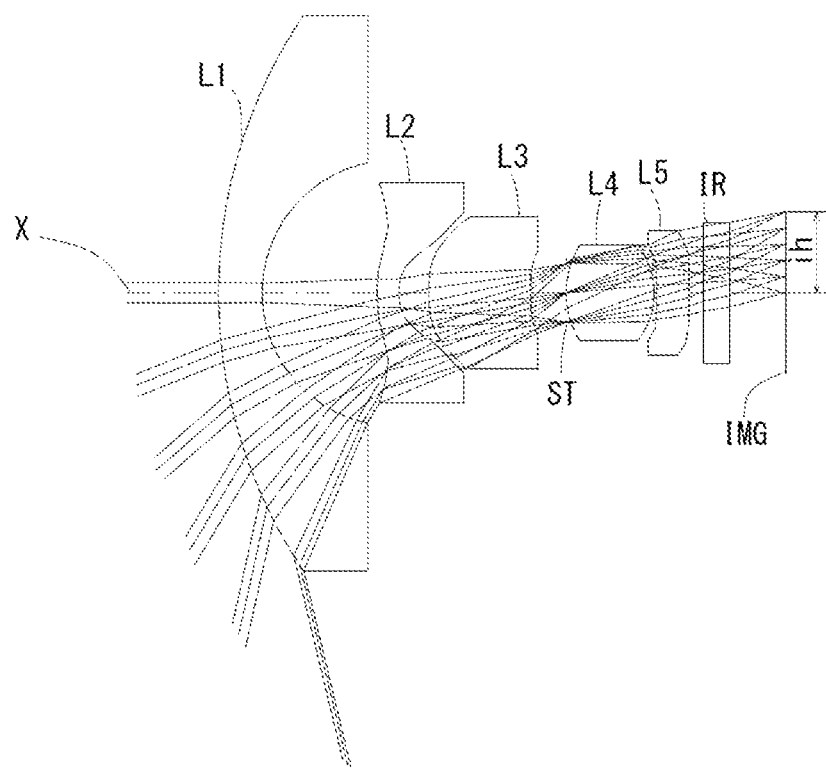
FIG. 5 is a schematic view showing the general configuration of an imaging lens in Example 3 according to the present invention.

FIG. 4 shows the spherical aberration (mm), the astigmatism (mm), and the distortion (%) of the imaging lens in Example 2.

EXAMPLE 3

The basic lens data is shown below in Table 3.

TABLE 3

Example3
Unit mm
f = 0.93
Fno = 2.0
ω(°) = 103.6
ih = 1.85
TTL = 12.75

Surface Data

| Surface Number i | Curvature Radius r | Surface Distance d | Refractive index Nd | Abbe Number νd |
|---|---|---|---|---|
| (Object) | Infinity | Infinity | | |
| 1 | 11.2778 | 1.0000 | 1.744 | 44.72 (vd1) |
| 2 | 3.0295 | 2.6327 | | |
| 3* | 28.0000 | 0.5000 | 1.535 | 56.16 (vd2) |
| 4* | 1.8000 | 0.6796 | | |
| 5* | 5.3073 | 2.3333 | 1.661 | 20.37 (vd3) |
| 6* | 5.7086 | 0.8186 | | |
| 7 (Stop) | infinity | 0.0000 | | |
| 8 | 2.0451 | 2.0159 | 1.550 | 75.50 (vd4) |
| 9 | −1.7367 | 0.0500 | | |
| 10* | 17.1392 | 0.7499 | 1.661 | 20.37 (vd5) |
| 11* | 80.9075 | 0.3197 | | |
| 12 | Infinity | 0.6100 | 1.517 | 64.17 |
| 13 | Infinity | 1.2482 | | |
| Image Plane | Infinity | | | |

Constituent Lens Data

| Lens | Start Surface | Focal Length | Composite Focal Length | | Back Focus | |
|---|---|---|---|---|---|---|
| 1 | 1 | −5.871 | f123 | −1.623 | b f | 1.970 |
| 2 | 3 | −3.622 | | | | |
| 3 | 5 | 34.485 | | | | |
| 4 | 8 | 2.105 | | | | |
| 5 | 10 | 32.758 | | | | |

Aspheric Surface Data

| | Third Surface | Fourth Surface | Fifth Surface | Sixth Surface | Tenth Surface | Eleventh Surface |
|---|---|---|---|---|---|---|
| k | −9.738778E−05 | −5.150000E−01 | −8.692110E−09 | 0.000000E+00 | 0.000000E+00 | 0.000000E+00 |
| A4 | 2.890614E−01 | 5.757366E−01 | 1.767472E−01 | 7.075482E−02 | −9.200815E−02 | −5.653677E−03 |
| A6 | −2.281365E−01 | −1.106851E−01 | −1.185494E−01 | −9.929620E−03 | 1.170607E−01 | −7.418940E−02 |
| A8 | 8.115504E−02 | −4.026218E−01 | 1.210995E−01 | 5.986825E−01 | −5.368476E−01 | 7.918156E−02 |
| A10 | −1.642449E−02 | 3.698875E−01 | −6.988168E−02 | −2.133648E+00 | 1.017741E+00 | −6.960440E−02 |
| A12 | 1.950807E−03 | −1.500902E−01 | 1.507711E−02 | 3.508070E+00 | −1.129979E+00 | 3.621673E−02 |
| A14 | −1.267090E−04 | 3.063774E−02 | 1.389065E−04 | −2.765045E+00 | 6.616892E−01 | −1.017406E−02 |
| A16 | 3.471092E−06 | −2.534346E−03 | −2.830904E−04 | 8.637626E−01 | −1.674022E−01 | 1.170613E−03 |

The imaging lens in Example 3 satisfies conditional expressions (1) to (17) as shown in Table 6.

Figure 6:
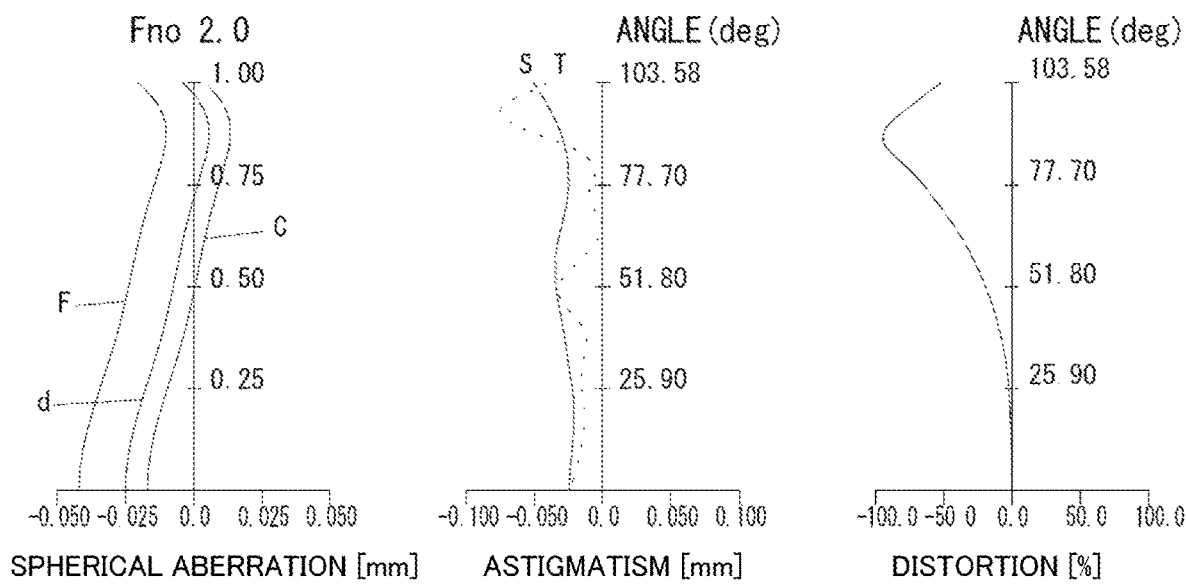
FIG. 6 shows spherical aberration, astigmatism, and distortion of the imaging lens in Example 3 according to the present invention.
Figure 7:
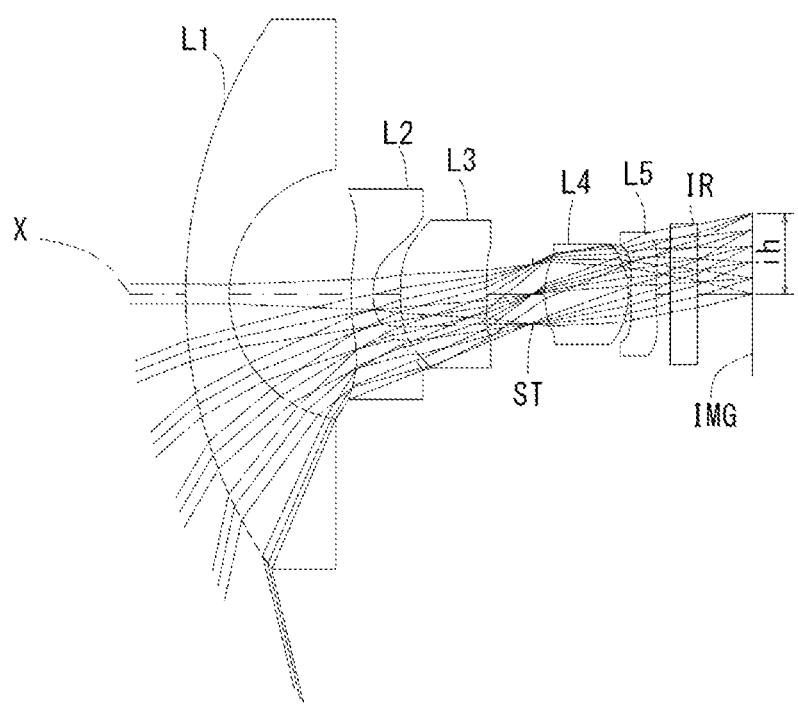
FIG. 7 is a schematic view showing the general configuration of an imaging lens in Example 4 according to the present invention.

FIG. 6 shows the spherical aberration (mm), the astigmatism (mm), and the distortion (%) of the imaging lens in Example 3.

EXAMPLE 4

The basic lens data is shown below in Table 4.

TABLE 4

Example4
Unit mm
f = 0.96
Fno = 2.0
ω(°) = 103.4
ih = 1.85
TTL = 12.76

Surface Data

| Surface Number i | Curvature Radius r | Surface Distance d | Refractive Index Nd | Abbe Number vd |
|---|---|---|---|---|
| (Object) | Infinity | Infinity | | |
| 1 | 11.0909 | 1.0000 | 1.744 | 44.72 (vd1) |
| 2 | 2.9040 | 2.7962 | | |
| 3* | 28.0000 | 0.5000 | 1.535 | 56.16 (vd2) |
| 4* | 1.8000 | 0.6288 | | |
| 5* | 7.6889 | 1.9698 | 1.661 | 20.37 (vd3) |
| 6* | −130.3722 | 1.0471 | | |
| 7 (Stop) | Infinity | 0.2860 | | |
| 8 | 2.1670 | 1.9165 | 1.550 | 75.50 (vd4) |
| 9 | −1.8443 | 0.0500 | | |
| 10* | 10.3920 | 0.5857 | 1.661 | 20.37 (vd5) |
| 11* | 6.4423 | 0.3301 | | |
| 12 | Infinity | 0.6100 | 1.517 | 64.17 |
| 13 | Infinity | 1.2510 | | |
| Image Plane | Infinity | | | |

Constituent Lens Data

| Lens | Start Surface | Focal Length | Composite Focal Length | | Back Focus | |
|---|---|---|---|---|---|---|
| 1 | 1 | −5.578 | f123 | −2.348 | b f | 1.983 |
| 2 | 3 | −3.622 | | | | |
| 3 | 5 | 11.051 | | | | |
| 4 | 8 | 2.180 | | | | |
| 5 | 10 | −27.261 | | | | |

Aspheric Surface Data

| | Third Surface | Fourth Surface | Fifth Surface | Sixth Surface | Tenth Surface | Eleventh Surface |
|---|---|---|---|---|---|---|
| k | 0.000000E+00 | −7.111143E−02 | −4.700081E−08 | 0.000000E+00 | 2.250000E+01 | 0.000000E+00 |
| A4 | 1.252826E−01 | 2.558687E−01 | 1.027121E−01 | 5.519620E−02 | −7.584138E−02 | −3.674875E−02 |
| A6 | −8.834606E−02 | −9.745400E−02 | −3.097525E−02 | 2.061782E−02 | −8.866601E−02 | −4.982746E−02 |
| A8 | 2.562461E−02 | −1.744333E−02 | 3.441519E−02 | −1.329832E−02 | 5.822607E−02 | 2.066963E−02 |
| A10 | −3.969624E−03 | 1.055979E−02 | −1.833207E−02 | 8.279252E−03 | −4.587047E−02 | −5.845123E−03 |
| A12 | 3.241312E−04 | −1.256678E−03 | 2.908028E−03 | 0.000000E+00 | 0.000000E+00 | 7.998377E−04 |
| A14 | −1.096162E−05 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

The imaging lens in Example 4 satisfies conditional expressions (1) to (17) as shown in Table 6.

Figure 8:
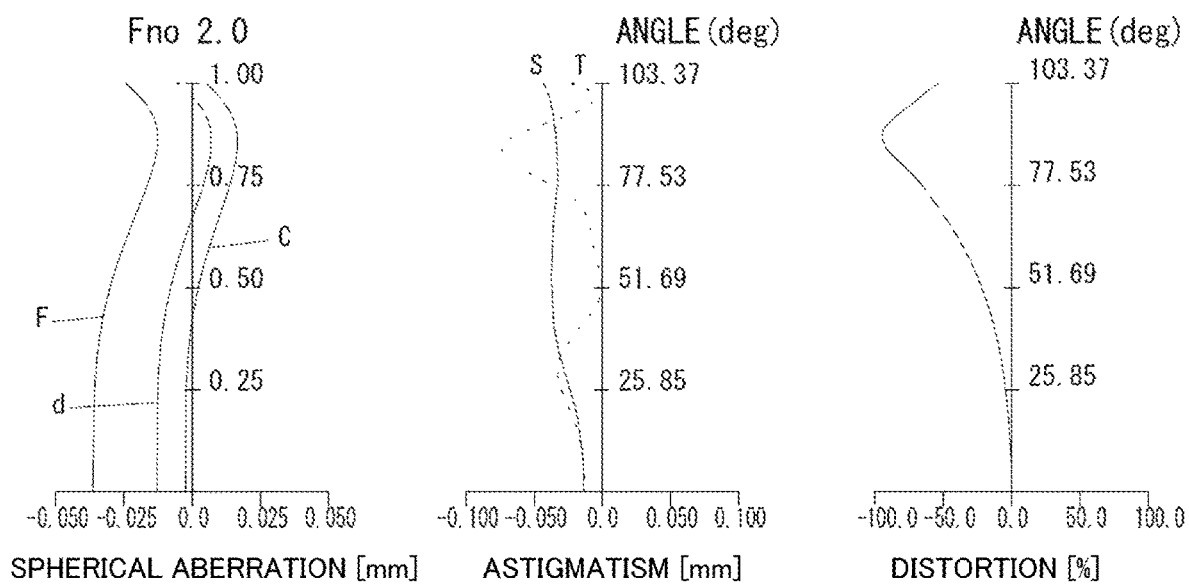
FIG. 8 shows spherical aberration, astigmatism, and distortion of the imaging lens in Example 4 according to the present invention.
Figure 9:
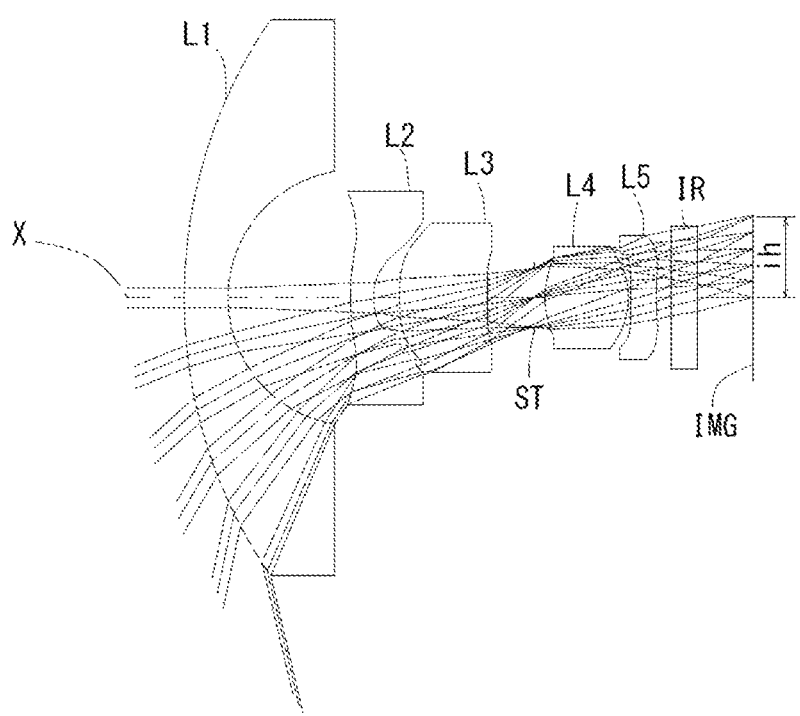
FIG. 9 is a schematic view showing a general configuration of an imaging lens in Example 5 according to the present invention.

FIG. 8 shows the spherical aberration (mm), the astigmatism (mm), and the distortion (%) of the imaging lens in Example 4.

EXAMPLE 5

The basic lens data is shown below in Table 5.

TABLE 5

Example5
Unit mm
f = 0.94
Fno = 2.0
ω(°) = 108.0
ih = 1.85
TTL = 12.76

Surface Data

| Surface Number i | Curvature Radius r | Surface Distance d | Refractive Index Nd | Abbe Number vd |
|---|---|---|---|---|
| (Object) | Infinity | Infinity | | |
| 1 | 11.0986 | 1.0000 | 1.744 | 44.72 (vd1) |
| 2 | 2.9092 | 2.7939 | | |
| 3* | 28.0000 | 0.5300 | 1.535 | 56.16 (vd2) |
| 4* | 1.8000 | 0.5890 | | |
| 5* | 7.7274 | 2.0078 | 1.661 | 20.37 (vd3) |
| 6* | Infinity | 1.0568 | | |
| 7 (Stop) | Infinity | 0.2599 | | |
| 8 | 2.1954 | 1.8970 | 1.550 | 75.50 (vd4) |
| 9 | −1.7899 | 0.0500 | | |
| 10* | 13.9835 | 0.5955 | 1.661 | 20.37 (vd5) |
| 11* | 8.4965 | 0.3303 | | |
| 12 | Infinity | 0.6100 | 1.517 | 64.17 |
| 13 | Infinity | 1.2509 | | |
| Image Plane | Infinity | | | |

Constituent Lens Data

| Lens | Start Surface | Focal Length | Composite Focal Length | | Back Focus | |
|---|---|---|---|---|---|---|
| 1 | 1 | −5.590 | f123 | −2.268 | b f | 1.983 |
| 2 | 3 | −3.624 | | | | |
| 3 | 5 | 11.695 | | | | |
| 4 | 8 | 2.156 | | | | |
| 5 | 10 | −34.249 | | | | |

Aspheric Surface Data

| | Third Surface | Fourth Surface | Fifth Surface | Sixth Surface | Tenth Surface | Eleventh Surface |
|---|---|---|---|---|---|---|
| k | 0.000000E+00 | −8.459917E−02 | 0.000000E+00 | 0.000000E+00 | 5.320000E+01 | 0.000000E+00 |
| A4 | 1.564940E−01 | 3.424019E−01 | 1.402155E−01 | 5.683552E−02 | −8.278411E−02 | −3.558933E−02 |
| A6 | −1.148954E−01 | −1.653788E−01 | −9.368663E−02 | 2.922295E−02 | −7.165862E−02 | −4.555847E−02 |
| A8 | 3.497470E−02 | −8.983209E−03 | 1.125311E−01 | −2.340495E−02 | 3.903469E−02 | 1.729529E−02 |
| A10 | −5.667772E−03 | 1.413531E−02 | −7.114236E−02 | 1.540024E−02 | −3.898372E−02 | −4.937456E−03 |
| A12 | 4.824406E−04 | −1.918759E−03 | 1.925347E−02 | 0.000000E+00 | 0.000000E+00 | 7.998377E−04 |
| A14 | −1.698716E−05 | 0.000000E+00 | −1.834013E−03 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

The imaging lens in Example 5 satisfies conditional expressions (1) to (17) as shown in Table 6.

Figure 10:
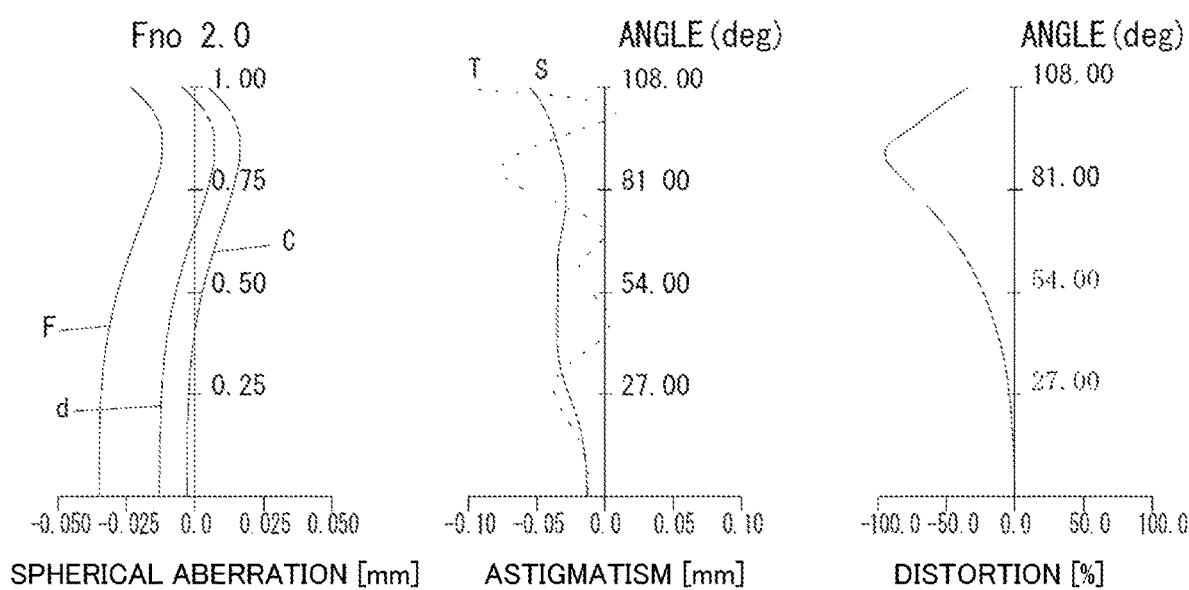
FIG. 10 shows spherical aberration, astigmatism, and distortion of the imaging lens in Example 5 according to the present invention.

FIG. 10 shows the spherical aberration (mm), the astigmatism (mm), and the distortion (%) of the imaging lens in Example 5.

In table 6, values of conditional expressions (1) to (17) related to the Examples 1 to 5 are shown.

TABLE 6

| | Conditional Expression | Example1 | Example2 | Example3 | Example4 | Example5 |
|---|---|---|---|---|---|---|
| (1) | T2/T3 | 0.20 | 0.20 | 0.83 | 0.47 | 0.45 |
| (2) | r3/r4 | 15.56 | 15.56 | 15.56 | 15.56 | 15.56 |
| (3) | r5/r6 | 0.24 | 0.23 | 0.93 | −0.06 | 7.73E−10 |
| (4) | (r9 + r10)/(r9 − r10) | 0.97 | 0.76 | −1.54 | 4.26 | 4.10 |
| (5) | f2/f | −3.84 | −3.88 | −3.87 | −3.78 | −3.86 |
| (6) | f123/f | −2.09 | −2.11 | −1.74 | −2.45 | −2.41 |
| (7) | f1/f | −5.98 | −5.94 | −6.28 | −5.82 | −5.95 |
| (8) | f3/f | 15.48 | 15.59 | 36.89 | 11.54 | 12.44 |
| (9) | |f5|/f | 44.01 | 44.36 | 35.04 | 28.46 | 36.44 |
| (10) | r1/r2 | 3.83 | 3.83 | 3.72 | 3.82 | 3.82 |
| (11) | r7/r8 | −1.16 | −1.17 | −1.18 | −1.17 | −1.23 |
| (12) | vd4 − vd5 | 51.32 | 51.32 | 55.13 | 55.13 | 55.13 |
| (13) | Fno | 2.00 | 2.00 | 2.00 | 2.00 | 2.00 |
| (14) | (1 − N3)/(r6 × f) × 1000 | −23.38 | −21.20 | −123.81 | 5.29 | −7.03E−08 |
| (15) | (N5 − 1)/(r9 × f) × 1000 | −0.43 | −3.04 | 41.24 | 66.39 | 50.27 |
| (16) | f4/f | 2.23 | 2.22 | 2.25 | 2.28 | 2.29 |
| (17) | bf/f | 2.14 | 2.12 | 2.11 | 2.07 | 2.11 |

When the imaging lens according to the present invention is adopted to a product with the camera function, there is realized contribution to the wide field of view, the low-profileness and the low F-number of the camera and also high performance thereof.

DESCRIPTION OF REFERENCE NUMERALS

ST: an aperture stop,
L1: first lens,
L2: second lens,
L3: third lens,
L4: fourth lens,
L5: fifth lens,
ih: maximum image height,
IR: filter,
IMG: imaging plane

What is claimed is:

1. An imaging lens comprising in order from an object side to an image side,
a first lens having negative refractive power,
a second lens,
a third lens,
a fourth lens, and
a fifth lens, wherein said second lens has the negative refractive power, and below conditional expressions (1), (2) and (3) are satisfied:

$$0.1 < T2/T3 < 1.16 \tag{1}$$

$$9 < r3/r4 < 20 \tag{2}$$

$$-0.1 < r5/r6 < 1.4 \tag{3}$$

where
T2: distance along an optical axis from an image-side surface of the second lens to an object-side surface of the third lens,
T3: distance along the optical axis from an image-side surface of the third lens to an object-side surface of the fourth lens,
r3: paraxial curvature radius of an object-side surface of the second lens,
r4: paraxial curvature radius of an image-side surface of the second lens,
r5: paraxial curvature radius of an object-side surface of the third lens, and
r6: paraxial curvature radius of an image-side surface of the third lens.

2. An imaging lens comprising in order from an object side to an image side,
a first lens having negative refractive power,
a second lens,
a third lens,
a fourth lens, and
a fifth lens, wherein said fourth lens has a biconvex shape having convex surfaces facing both an object side and an image side near an optical axis, and below conditional expressions (1), (3), (4) and (5) are satisfied:

$$0.1 < T2/T3 < 1.16 \tag{1}$$

$$-0.1 < r5/r6 < 1.4 \tag{3}$$

$$-1.85 < (r9+r10)/(r9-r10) < 5.00 \tag{4}$$

$$-5.1 < f2/f < -2.65 \tag{5}$$

where
T2: distance along an optical axis from an image-side surface of the second lens to an object-side surface of the third lens,
T3: distance along the optical axis from an image-side surface of the third lens to an object-side surface of the fourth lens,
r5: paraxial curvature radius of an object-side surface of the third lens,
r6: paraxial curvature radius of an image-side surface of the third lens,
r9: paraxial curvature radius of an object-side surface of the fifth lens,
r10: paraxial curvature radius of an image-side surface of the fifth lens,
f2: focal length of the second lens, and
f: focal length of the overall optical system of the imaging lens.

3. The imaging lens according to claim 1, wherein an image-side surface of said fifth lens is a concave surface facing the image side near the optical axis.

4. The imaging lens according to claim 1, wherein a below conditional expression (6) is satisfied:

$$-3.5 < f123/f < -1.0 \qquad (6)$$

where
f123: composite focal length of the first lens, the second lens and the third lens, and
f: focal length of the overall optical system of the imaging lens.

5. The imaging lens according to claim 1, wherein a below conditional expression (7) is satisfied:

$$-9.5 < f1/f < -2.5 \qquad (7)$$

where
f1: focal length of the first lens, and
f: focal length of the overall optical system of the imaging lens.

6. The imaging lens according to claim 1, wherein a below conditional expression (8) is satisfied:

$$5.7 < f3/f \qquad (8)$$

where
f3: focal length of the third lens, and
f: focal length of the overall optical system of the imaging lens.

7. The imaging lens according to claim 1, wherein a below conditional expression (9) is satisfied:

$$14.5 < |f5|/f \qquad (9)$$

where
f5: focal length of the fifth lens, and
f: focal length of the overall optical system of the imaging lens.

8. The imaging lens according to claim 1, wherein a below conditional expression (10) is satisfied:

$$1.85 < r1/r2 < 5.75 \qquad (10)$$

where
r1: paraxial curvature radius of an object-side surface of the first lens, and
r2: paraxial curvature radius of an image-side surface of the first lens.

9. The imaging lens according to claim 1, wherein a below conditional expression (11) is satisfied:

$$-1.85 < r7/r8 < -0.55 \qquad (11)$$

where
r7: paraxial curvature radius of an object-side surface of the fourth lens, and
r8: paraxial curvature radius of an image-side surface of the fourth lens.

10. The imaging lens according to claim 1, wherein a below conditional expression (12) is satisfied:

$$28 < vd4 - vd5 < 78 \qquad (12)$$

where
vd4: abbe number at d-ray of the fourth lens, and
vd5: abbe number at d-ray of the fifth lens.

11. The imaging lens according to claim 1, wherein a below conditional expression (13) is satisfied:

$$Fno \leq 2.4 \qquad (13)$$

where
Fno: F-number.

12. The imaging lens according to claim 2, wherein an image-side surface of said fifth lens is a concave surface facing the image side near the optical axis.

13. The imaging lens according to claim 2, wherein a below conditional expression (6) is satisfied:

$$-3.5 < f123/f < -1.0 \qquad (6)$$

where
f123: composite focal length of the first lens, the second lens and the third lens, and
f: focal length of the overall optical system of the imaging lens.

14. The imaging lens according to claim 2, wherein a below conditional expression (7) is satisfied:

$$-9.5 < f1/f < -2.5 \qquad (7)$$

where
f1: focal length of the first lens, and
f: focal length of the overall optical system of the imaging lens.

15. The imaging lens according to claim 2, wherein a below conditional expression (8) is satisfied:

$$5.7 < f3/f \qquad (8)$$

where
f3: focal length of the third lens, and
f: focal length of the overall optical system of the imaging lens.

16. The imaging lens according to claim 2, wherein a below conditional expression (9) is satisfied:

$$14.5 < |f5|/f \qquad (9)$$

where
f5: focal length of the fifth lens, and
f: focal length of the overall optical system of the imaging lens.

17. The imaging lens according to claim 2, wherein a below conditional expression (10) is satisfied:

$$1.85 < r1/r2 < 5.75 \qquad (10)$$

where
r1: paraxial curvature radius of an object-side surface of the first lens, and
r2: paraxial curvature radius of an image-side surface of the first lens.

18. The imaging lens according to claim 2, wherein a below conditional expression (11) is satisfied:

$$-1.85 < r7/r8 < -0.55 \qquad (11)$$

where
r7: paraxial curvature radius of an object-side surface of the fourth lens, and
r8: paraxial curvature radius of an image-side surface of the fourth lens.

19. The imaging lens according to claim 2, wherein a below conditional expression (12) is satisfied:

$$28 < vd4 - vd5 < 78 \qquad (12)$$

where
vd4: abbe number at d-ray of the fourth lens, and
vd5: abbe number at d-ray of the fifth lens.

20. The imaging lens according to claim 2, wherein a below conditional expression (13) is satisfied:

$$Fno \leq 2.4 \qquad (13)$$

where
Fno: F-number.

* * * * *